United States Patent
Braat et al.

(12) 
(10) Patent No.: US 6,417,274 B1
(45) Date of Patent: *Jul. 9, 2002

(54) PROCESS FOR THE MANUFACTURE OF FUNCTIONALIZED POLYPHENYLENE ETHER RESINS

(75) Inventors: Adrianus J. F. M. Braat, Roosendaal; Rene de Jongh; Juraj Liska, both of Bergen op Zoom, all of (NL)

(73) Assignee: General Electric Co., Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,245

(22) Filed: Feb. 5, 1999

(51) Int. Cl.[7] .......................... C08L 71/12; C08G 65/48
(52) U.S. Cl. ..................... 525/132; 525/390; 525/391; 525/392; 525/394; 525/397; 528/205; 528/212; 528/215; 528/217
(58) Field of Search ................. 525/390, 391, 525/392, 397, 394, 132; 528/212, 215, 217, 205

(56) References Cited

U.S. PATENT DOCUMENTS

| | | | |
|---|---|---|---|
| 3,306,874 A | 2/1967 | Hay | |
| 3,306,875 A | 2/1967 | Hay | |
| 3,733,299 A | 5/1973 | Cooper | |
| 3,838,102 A | 9/1974 | Bennett | |
| 3,900,445 A | 8/1975 | Cooper et al. | |
| 3,988,297 A | 10/1976 | Bennett et al. | |
| 4,097,556 A | 6/1978 | Toyama et al. | |
| 4,283,511 A | 8/1981 | Ueno et al. | 525/392 |
| 4,315,086 A | 2/1982 | Ueno et al. | 525/391 |
| 4,338,410 A | 7/1982 | Ueno et al. | 525/132 |
| 4,460,764 A | 7/1984 | Reffert et al. | 528/487 |
| 4,482,705 A | 11/1984 | Hambrecht et al. | 528/486 |
| 4,536,567 A * | 8/1985 | Hambrecht | 528/486 |
| 4,600,741 A | 7/1986 | Aycock et al. | |
| 4,618,668 A | 10/1986 | Muench et al. | 528/215 |
| 4,642,358 A | 2/1987 | Aycock et al. | |
| 4,654,405 A | 3/1987 | Jalbert et al. | 525/391 |
| 4,654,418 A | 3/1987 | Berger et al. | 528/486 |
| 4,692,482 A | 9/1987 | Lohrengel | |
| 4,696,996 A | 9/1987 | Brandt et al. | 528/214 |
| 4,732,937 A | 3/1988 | Sybert | 525/92 |
| 4,732,938 A | 3/1988 | Grant et al. | 525/92 |
| 4,743,661 A | 5/1988 | Mitulla et al. | 525/396 |
| 4,746,482 A | 5/1988 | Ribbing et al. | |
| 4,746,708 A | 5/1988 | Sybert | 525/392 |
| 4,751,268 A | 6/1988 | Taubitz et al. | 525/132 |
| 4,755,566 A | 7/1988 | Yates, III | |
| 4,797,453 A | 1/1989 | Taubitz et al. | 525/397 |
| 4,808,601 A | 2/1989 | Kadin | 514/374 |
| 4,808,671 A | 2/1989 | Sivavec | 525/397 |
| 4,808,674 A | 2/1989 | Johnson et al. | 525/397 |
| 4,814,431 A | 3/1989 | Bartmann et al. | |
| 4,873,286 A | 10/1989 | Gallucci et al. | 525/92 |
| 4,888,397 A | 12/1989 | Van Der Meer et al. | |
| 4,994,531 A | 2/1991 | Brown et al. | |
| 5,000,897 A | 3/1991 | Chambers | |
| 5,069,818 A | 12/1991 | Aycock et al. | |
| 5,153,266 A | 10/1992 | Muehlbach et al. | 525/66 |
| 5,159,027 A | 10/1992 | Kanayama et al. | 525/391 |
| 5,171,825 A | 12/1992 | Hedtmann-Rein et al. | 528/214 |
| 5,177,156 A | 1/1993 | Aritomi et al. | 525/393 |
| 5,245,105 A | 9/1993 | Lin et al. | 585/818 |
| 5,247,006 A | 9/1993 | Khouri et al. | |
| 5,348,569 A | 9/1994 | Bikson et al. | 95/45 |
| 5,360,866 A | 11/1994 | Arashiro et al. | 525/68 |
| 5,391,603 A | 2/1995 | Wessel et al. | 524/396 |

FOREIGN PATENT DOCUMENTS

| | | |
|---|---|---|
| EP | 0 126 971 A1 | 12/1984 |
| EP | 0126971 * | 12/1984 |
| EP | 0 103275 | 4/1986 |
| EP | 285970 A | 3/1988 |
| EP | 0 226 002 B1 | 3/1989 |
| EP | 0 207 390 B1 | 9/1989 |
| EP | 0 207 387 B1 | 5/1990 |
| EP | 0 262 528 B1 | 1/1991 |
| EP | 0 301 404 B1 | 3/1992 |
| EP | 0 314 004 B1 | 5/1992 |
| EP | 338 425 B1 | 3/1993 |
| EP | 548 683 A1 | 6/1993 |
| EP | 0 594 228 A2 | 4/1994 |
| EP | 417 545 B1 | 6/1994 |
| EP | 402 721 B1 | 11/1994 |
| EP | 548 684 A1 | 6/1996 |
| EP | 512 283 B1 | 11/1996 |
| EP | 510 391 B1 | 1/1997 |
| JP | 5279472 A | 10/1993 |

* cited by examiner

Primary Examiner—Patricia A. Short

(57) ABSTRACT

The invention relates to a novel process for preparing functionalized PPE, the process comprising oxidative coupling in a reaction solution at least one monovalent phenol species using an oxygen containing gas and a complex metal catalyst to produce a PPE; and functionalizing the PPE prior to and/or during at least one isolation step for devolatilization of the reaction solvent. The invention also relates to the polyphenylene ether resin made by the process as well as blends and articles containing the polyphenylene ether resin made by the process.

28 Claims, No Drawings

PROCESS FOR THE MANUFACTURE OF FUNCTIONALIZED POLYPHENYLENE ETHER RESINS

CROSS-REFERENCE TO RELATED APPLICATIONS

Not Applicable.

FEDERALLY SPONSORED RESEARCH

Not Applicable.

BACKGROUND OF THE INVENTION

1. Field of the Invention

The invention relates to a novel process for the manufacture of functionalized polyphenylene ether resin.

The invention also relates to the functionalized polyphenylene ether resins made by the process as well as blends and articles containing the functionalized polyphenylene ether resin made by the process.

2. Brief Description of the Related Art

Polyphenylene ether resins (hereinafter "PPE") are commercially attractive materials because of their unique combination of physical, chemical, and electrical properties. Furthermore, the combination of PPE with other resins provides blends which result in additional overall properties such as chemical resistance, high strength, and high flow.

One technical obstacle to the development of such blends is the lack of compatibility between PPE and many resins. This lack of compatibility manifests itself often through very poor physical properties as well as delamination in molded parts. Methods have been developed to improve the PPE compatibility with many resins such as, for example, with polyesters and polyamides. One of the more effective methods involves functionalizing PPE to make functionalized PPE containing moieties that are reactive with the other resin in the blend. It is believed that when the functionalized PPE is allowed to react with the other resin that relatively small amounts of copolymer between the resins are formed. The copolymer is believed to be in large part responsible for improved compatibility between the PPE and the other resin. Indications of improved compatibility include resistance to lamination, improved physical properties such as increased tensile and impact properties and a stabilized morphology between the blend component phases under static and/or low shear conditions.

Methods to prepare functionalized PPE have included solution functionalization with an acid halide containing compound, such as trimellitic anhydride acid chloride, to make an endcapped PPE containing the reactive moiety. This method is rather limited in the variety of functionalized PPE that can be made. Also, the by-products from the capping reaction tend to cause emulsion and/or isolation issues in the solvent precipitation stage of the process.

Another known method to prepare functionalized PPE related to melt functionalization of the PPE in an extruder. This method involved melting and mixing PPE with a functionalizing agent to result in a functionalized PPE. The additional polymers could be fed into the same extruder or alternatively, the functionalized PPE could be isolated and subsequently used to prepare other compositions. Melt functionalization has issues, such as difficulty in feeding PPE into the extruder due to low bulk density and wide particle size distribution. Moreover, PPE are often powders and require special handling to avoid potential dust explosion.

It is therefore apparent that a need continues to exist for improved methods to prepare functionalized PPE.

SUMMARY OF THE INVENTION

The needs discussed above have been generally satisfied by the discovery of a process for preparing functionalized PPE, the process comprising oxidative coupling in a reaction solution at least one monovalent phenol species using an oxygen containing gas and a complex metal catalyst to produce a PPE; and functionalizing the PPE prior to and/or during at least one isolation step for devolatilization of the reaction solvent.

The description that follows provides further details regarding various embodiments of the invention.

DESCRIPTION OF THE DRAWINGS

Not applicable.

DETAILED DESCRIPTION OF THE INVENTION

One embodiment of this invention provides for a process for the preparation of functionalized PPE, preferably having an intrinsic viscosity between about 0.08 dl/g and 0.60 dl/g, by oxidative coupling at least one monovalent phenol species, preferably at least a portion of which have substitution in at least the two ortho positions and hydrogen or halogen in the para position, using an oxygen containing gas and a complex metal-amine catalyst, preferably a copper (I)-amine catalyst, as the oxidizing agent and, preferably extracting at least a portion of the metal catalyst as a metal-organic acid salt with an aqueous containing solution, and functionalizing the PPE prior to and/or during at least one isolation step for devolatilization of the reaction solvent. In one embodiment, the functionalization is at least partly done in a flash process to concentrate the PPE reaction solution. In another embodiment, the functionalization is at least partly done prior to a flash process to concentrate the PPE reaction solution. In yet another embodiment, the functionalization is at least partly done in a devolatilizing extruder. These and other embodiments will become apparent in the description that follows.

The PPE employed in the present invention are known polymers comprising a plurality of structural units of the formula

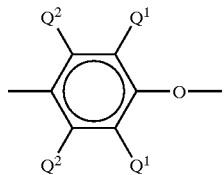

wherein each structural unit may be the same or different, and in each structural unit, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl- 1,4-phenylene ether units. Suitable copolymers include random copolymers containing such units in combination with (for example) 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly (phenylene ether) chains to produce a higher molecular weight polymer, provided a substantial proportion of free OH groups remains. Also included are PPE's containing a functional endgroup, obtained from reaction with a reactive compound having the functional endgroup.

The molecular weight and intrinsic viscosity of the PPE can vary widely, depending at least in part on the intended end-use for the PPE. The intrinsic viscosity (hereinafter "I.V.") of the PPE is most often in the range of about 0.08–0.60 dl./g., preferably in the range of about 0.10–0.49 dl./g., as measured in chloroform at 25° C. One unexpected aspect of the process is the ability to utilize a very wide range of I.V.

The PPE are typically prepared by the oxidative coupling of at least one monohydroxyaromatic compound such as 2,6-xylenol, 2,3,6-trimethylphenol, or mixtures of the foregoing. Catalyst systems are generally employed for such coupling and they typically contain at least one heavy metal compound such as a copper, manganese, or cobalt compound, usually in combination with various other materials.

It will be apparent to those skilled in the art from the foregoing that the PPE contemplated in the present invention include all those presently known, irrespective of variations in structural units or ancillary chemical features.

The polymerization of the phenolic monomer may be carried out by adding the phenolic monomer or monomers to a suitable reaction solvent and preferably, a copper-amine catalyst. It is preferred to carry out the polymerization in the presence of a cupric or cuprous salt-secondary amine catalyst such as, for example, cupric chloride and di-n-butylamine. The polymerizations are advantageously carried out in the presence of an inorganic alkali metal bromide or an alkaline earth metal bromide. The inorganic bromides may be used at a level of from about 0.1 mole to about 150 moles per 100 moles of phenolic monomer. These catalyst materials are described in U.S. Pat. No. 3,733,299 (Cooper et al.). Tetraalkylammonium salts may also be employed as promoters if desired. These promoters are disclosed in U.S. Pat. No. 3,988,297 (Bennett et al.).

The primary, secondary or tertiary amine component of the catalyst complex generally correspond to those disclosed in U.S. Pat. Nos. 3,306,874 and 3,306,875 (Hay). Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower)alkyl amines, the alkyl groups having from 1 to 6 carbon atoms. Typically, there can be used mono-, di- and tri-methyl, ethyl, n-propyl i-propyl, n-butyl substituted amines, mono- and di-cyclohexylamine, ethylmethyl amine, morpholine, N-(lower)alkyl cycloaliphatic amines, such as N-methylcyclohexylamine, N,N'-dialkylethylenediamines, the N,N'-dialkylpropanediamines, the N,N'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butane-diamines, and the like.

Mixtures of such primary, secondary and tertiary amines may be used. A preferred mono alkyl amine is n-butyl amine; a preferred dialkyl amine is di-n-butyl amine; and a preferred trialkyl amine is triethylamine. A preferred cyclic tertiary amine is pyridine. The concentration of primary and secondary amine in the reaction mixture may vary within wide limits, but is desirably added in low concentrations. A preferred range of non-tertiary amines comprises from about 2.0 to about 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only about 10 moles of tertiary amine, e.g., triethylamine, per 100 moles of phenol need be used as a lower limit. Even smaller amounts of tertiary diamines, such as N,N,N'N'-tetramethylbutanediamine can be used, down to as low as about 0.2 mole per 100 moles of phenol.

Typical examples of cuprous salts and cupric salts suitable for the process are shown in the Hay patents. These salts include, for example, cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts include the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirably maintained low and preferably varies from about 0.2 to 2.5 moles per 100 moles of monovalent phenol. With tertiary amines, the copper salt is preferably used in an amount providing from about 0.2 to about 15 moles per 100 moles of the monovalent phenol.

Cupric halides are generally preferred over cuprous halides for the preparation of the copper amine catalyst because of their lower cost. The use of the copper (I) species also greatly increases the rate of oxygen utilization in the early stages of the polymerization reaction and the lower oxygen concentration in the head space of the reactor helps in reducing the risk of fire or explosion in the reactor. A process for the preparation and use of suitable copper-amine catalysts is disclosed in U.S. Pat. No. 3,900,445 (Cooper et al.).

A faster initial reaction rate with the copper (I) based catalyst also results in less accumulation of unreacted monomer and a reduction in the amount of undesirable tetramethyldiphenylquinone produced. The tetramethyldiphenylquinone, a backward dimer, is believed to incorporate into the PPE through equilibration reactions. The equilibration reactions lead to a drop in the intrinsic viscosity of the PPE due to the decrease in molecular weight of the PPE from the incorporation of the dimer. Minimization of the tetramethyldiphenylquinone during the oxidation coupling is desirable so as to avoid the drop in molecular weight and the accompanying difficulties in having to build to a higher than desired molecular weight to offset the loss during equilibration of the backward dimer. It was unexpectedly found that the present invention affords a process in which the PPE in the reaction mixture shows less than a 10% drop, preferably less than a 5% drop, most preferably less than a 3% drop in I.V. during an equilibration step after the oxidative polymerization of the phenolic monomers.

The polymerization reaction is preferably performed in a solvent. Suitable solvents are disclosed in the above-noted Hay patents. Aromatic solvents such as benzene, toluene, ethylbezene, xylene, and o-dichlorobenzene are especially preferred, although tetrachloromethane, trichloromethane, dichloromethane, 1,2-dichloroethane and trichloroethylene may also be used. The weight ratio between solvent and monomer is normally in the range from 1:1 to 20:1, ie. up to a maximum 20-fold excess of solvent. The ratio between solvent and monomer is preferably in the range from 1:1 to 10:1 by weight.

One unexpected advantage of the present process when used to make low I.V. PPE is that a higher solids loading is possible as compared to processes that make higher (i.e. >0.28 I.V.) PPE. Without the increased solution viscosity build that concomitantly accompanies high molecular weight polymer, the final solids concentration can be increased by at least 20%, with increases of 30% or more possible. Thus, the present process affords a method for increased reactor utilization and productivity without increasing the size or number of the reactor vessels.

The process and reaction conditions for the polymerization, such as reaction time, temperature, oxygen flow rate and the like are modified based on the exact target molecular weight desired. The endpoint of the polymerization is conveniently determined with an in-line viscosity meter. Although other methods such as making molecular weight measurements, running to a predetermined reaction time, controlling to a specified endgroup concentration, or the oxygen concentration in solution may also be utilized.

The temperature to carry out the polymerization stage of the invention generally ranges from about 0° C. to about 95° C. More preferably, the temperature range is from about 35° C. to about 45° C. with the higher reaction temperature near the end of reaction. At substantially higher temperatures, side reactions can occur leading to reaction by-products and at temperatures substantially lower, ice crystals form in the solution.

Many diverse extractants or chelating agents may be used in the practice of the invention to complex with the catalyst after the end of the polymerization reaction. For example, sulfuric acid, acetic acid, ammonium salts, bisulfate salts and various chelating agents may be used. When these materials are added to a PPE reaction solution, the copper-amine catalyst becomes poisoned and further oxidation does not take place. Many different materials may be used but it is preferred to employ those chelating agents that are disclosed in U.S. Pat. No. 3,838,102 (Bennett et al.).

The useful chelating agents include polyfunctional carboxylic acid containing compounds such as, for example, sodium potassium tartrate, nitrilotriacetic acid (NTA), citric acid, glycine and especially preferably they will be selected from polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. The preferred agents include ethylenediaminetetraacetic acid (EDTA), hydroxyethylenediaminetriacetic acid, diethylenetriaminepentaacetic acid and their salts. Especially preferred are ethylenediaminotetraacetic acid or a mono-, di-, tri- and tetrasodium salt thereof and the resulting copper complex can be referred to as a copper carboxylate complex.

The chelated metallic catalyst component can be extracted with the water produced in the polymerization reaction through the use of a liquid/liquid centrifuge. The preferred extraction liquid for use in the process of the invention is an aqueous solution of lower alkanol, i.e., a mixture of water and an alkanol having from 1 to about 4 carbon atoms. Generally from about 1% to about 80% by volume of an alkanol or glycol may be employed. These ratios may vary from about 0.01:1 to about 10:1 parts by volume of aqueous liquid extractant to discrete organic phase.

The reaction media generally comprises an aqueous environment. Anti-solvents can also be utilized in combination with the aqueous media to help drive the precipitation of the copper (I) species. The selection of an appropriate anti-solvent is based partially on the solubility co-efficient of the copper (I) species that is being precipitated. The halides are highly insoluble in water, log $K_{sp}$ values at 25° C. are −4.49, −8.23 and −11.96 for CuCl, CuBr and CuI, respectively. Solubility in water is increased by the presence of excess of halide ions due to the formation of, e.g., $CuCl_2$, $CuCl_3$, and $CuCl_4$ and by other complexing species. Non-limiting examples of anti-solvents would comprise low molecular weight alkyl and aromatic hydrocarbons, ketones, alcohols and the like which in themselves would have some solubility in the aqueous solution. One skilled in the art would be able to select an appropriate type and amount of anti-solvent, if any was utilized.

After removal of the catalyst, the PPE containing solution is concentrated to a higher solids level as part of the isolation of the PPE. It was unexpectedly found that PPE can be readily functionalized prior to and/or during this solvent removal process by addition of at least one functionalizing agent, also known as compatibilizers or functionalizers. The location of the addition of the at least one functionalizing agent will depend on several factors such as the stability of the agent, the volatility of the agent to the isolation conditions, the flexibility of the equipment for addition points, and the like. For functionalizing agents that are volatile in the isolation process, addition of the functionalizing agent prior to solvent removal is often preferred so as not to remove the functionalizing agent before it has functionalized the PPE. For less volatile functionalizing agents, greater flexibility in the location of the addition is possible. It is also possible to add at least one functionalizing agent at several points during the process.

In one embodiment, the functionalizing agent includes compounds having both (i) a carbon-carbon double bond or a carbon-carbon triple bond and (ii) at least one species of the group consisting of carboxylic acids, acid anhydrides, acid amides, acid esters, imides, amines, ortho esters, hydroxyls and carboxylic acid ammonium salts. Illustrative compounds useful to accomplish the functionalization of the PPE include maleic anhydride, fumaric acid, maleimides such as N-phenylmaleimide and 1,4phenylene-bis-methylene-alpha, alpha'-bismaleimide, maleic hydrazide, methylnadic anhydride, fatty oils (e.g., soybean oil, tung oil, linseed oil, sesame oil), acrylate ortho esters and methacrylate ortho esters, unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Examples of such typical reagents for preparing useful functionalized PPE are described in U.S. Pat. Nos. 4,315,086, 4,755,566, 4,888,397, and 5,247,006.

Non-polymeric aliphatic polycarboxylic acids are also useful for preparing functionalized PPE. Included in the group of species, are, for example, the aliphatic polycarboxylic acids, and acid esters represented by the formula:

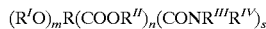

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl, or carbonyl dioxy group of 1 to 10, preferably 1 to 6, most preferably 1 to 4, carbon atoms, with hydrogen being especially preferred; each $R^{II}$ is independently selected from the group consisting of hydrogen or an alkyl or aryl group of from 1 to 20 carbon atoms preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero; and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative acid esters useful herein include, for example, acetyl citrate and mono- and/or di-stearyl citrates and the like. Suitable acid amides useful herein include, for example, N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Examples of suitable functionalizing compounds can be found in U.S. Pat. Nos. 4,315,086, 4,755,566, 4,873,286 and 5,000,897.

Other useful functionalizing agents useful in the process of the invention for preparing functionalized PPE include compounds containing an acyl functional group and at least one species of the group consisting of carboxylic acids, acid anhydrides, acid esters, acid amides, imides, amines, ortho esters, hydroxyls and carboxylic acid ammonium salts. Non-limiting examples include chloroformyl succinic anhydride, chloroethanoyl succinic anhydride, trimellitic anhydride acid chloride, 1-acetoxy-acetyl-3,4-dibenzoic acid anhydride, terephthalic acid chloride, and reactive triazines including epoxyalkyl chlorocyanurates and chloroaryloxytriazines. Additional examples can be found in U.S. Pat. Nos. 4,600,741 and 4,642,358.

The amount of the above mentioned functionalizing agents that is required to appropriately functionalize the PPE is that which is sufficient to improve the compatibility between the various components in the final composition. As previously discussed, indications of improved compatibility include resistance to lamination, improved physical properties such as increased tensile and impact properties and a stabilized morphology between the blend component phases under static or low shear conditions.

An effective amount of the above mentioned functionalizers, based on the amount of the PPE, is generally up to about 8% by weight, and is preferably from about 0.05% to about 4% by weight. In the most preferred embodiments, the amount of functionalizing agent is in the range of about 0.1% to about 2.0% by weight based on the amount of the PPE. The actual amount utilized will also depend on the molecular weight of the functionalizing agent, the number and type of reactive species per molecule of functionalizing agent and the degree of compatibility that is desired in the final resin blend composition.

Concentration of the PPE containing solution is accomplished by reducing the pressure in a solvent flash vessel while preferably increasing the temperature of the PPE containing solution. Pressures of about to 35 to 50 bar are desirable with solution temperatures increased to at least 200° C., preferably to at least 230° C. A solids level of PPE of at least 55%, preferably of at least 65% or higher is desirable.

A total isolation process is preferred for isolating the PPE. As part of the total isolation, a portion of the solvent is preferably removed in order to reduce the solvent load on the total isolation equipment. Functionalizing agent can be effectively added to the PPE at several locations during the isolation process. For example, functionalizing agent may be added prior to removal of solvent, the functionalizing agent may be added during the concentration of the reaction mixture, or both. Likewise, functionalizing agent can be added with the concentrated reaction solution into the final devise for solvent removal. Functionalizing agent may alternatively be added simultaneously at several different locations. The selection of the addition location may be dictated by the actual equipment utilized and by the properties of functionalizing agent with a determination of an optimum location.

The final isolation of the PPE is preferably carried out in a devolatilizing extruder although other methods involving spray drying, wiped film evaporators, flake evaporators, and flash vessels with melt pumps, including various combinations involving these methods are also useful and in some instances preferred. As previously described, total isolation is preferable from the viewpoint that oligomeric species are not removed to the same degree as with precipitation. Likewise, isolation yields are extremely high and are near quantitative. These techniques require however that the catalyst removal be completed in the prior process steps as any catalyst remaining in solution will necessarily be isolated in the PPE.

Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including the aforementioned Welding Engineers, Inc.

In the practice of the present invention, the preheated concentrated solution containing the PPE is fed into the devolatilizing extruder and maintained at a temperature less than about 300° C., and preferably less than about 275° C., with pressures in the vacuum vent of less than about 1 bar. The exact temperature will depend in large part on the I.V. of the PPE and the corresponding viscosity associated with that I.V. resin. The functionalizing agent can be added at various locations along the length of the extruder with good results. The resultant solvent level is preferably reduced to less than about 1200 ppm, preferably less than about 600 ppm, and most preferably less than about 400 ppm.

Another unexpected result obtained through the use of a devolatilizing extruder was the extremely high yield of PPE achieved in the process. For example, a PPE yield of over 99% was obtained even for PPE having a low I.V. (typically on the order of about 0.08 dl/g to about 0.25 dl/g) whereas in the precipitation process known in the art, the yield of similar low I.V. PPE was less than 90%. Thus, the present process comprising a devolatilizing extruder affords a method to prepare functionalized low molecular weight polyphenylene ether resin, typically within the intrinsic viscosity range of about 0.08 dl/g to about 0.25 dl/g, in a yield of over 90%, preferably over 95%, more preferably over 98% and most preferably over 99%, based upon the amount of monovalent phenol utilized in the oxidative coupling.

When using a devolatilization extruder for the total isolation of the low I.V. functionalized PPE as previous described, it was found that traditional underwater or water spray cooling of strands of extrudate followed by chopping the extrudate into pellets gave unacceptable results presumably due to the low melt strength and inherent brittle nature of low I.V. PPE. It was found that special pelletization techniques can overcome these difficulties. Useful techniques include die-face pelletization, including underwater pelletization and flaking, declining angle strand pelletization using water spraying, and vibration drop pelletization with underwater pelletization especially suitable.

The collected PPE pellets can be dried using techniques standard in the art including centrifugal dryers, batch or continuous oven dryers, fluid beds, and the like. Determination of an appropriate set of conditions can be readily determined by one of skill in the art without undue experimentation.

As an alternative to completely isolating the functionalized PPE, one or more resins may be added to the devolatilized functionalized PPE in the same process. The one or more resins may be fed into the devolatilizing extruder although additional extruders may also be used. Possible variations include melt feeding the one or more resins into the devolatilizing extruder or melt feeding the functionalized PPE from the devolatilizing extruder into a second compounding extruder as well as combinations of these. Accordingly, in one embodiment a compatibilized blend is afforded by the process without complete isolation of the functionalized PPE. The one or more resins can vary widely and can also include additives common to such compatibilized blends. Such additives include impact modifiers, lubricants, flame retardants, pigments, colorants, fillers, reinforcing agents, carbon fibers and fibrils, and the like. Preferred resins include polyamides, polyesters, polyarylene sulfides, polycarbonates, polyetherimides, functionalized polyolefins, polysulfones, polyethersulfones, and the like.

All patents cited by reference are incorporated herein by reference.

In order that those skilled in the art will be better able to practice the invention, the following examples are given by way of illustration and not by way of limitation.

EXAMPLES

Polymerization Reaction

A typical laboratory reaction recipe and reaction conditions are indicated below:

The catalyst solution can be prepared by stirring 0.41 g of cuprous bromide and 10.9 g of di-n-butyl amine in 100 ml of toluene. The catalyst is transferred to a one liter stirred glass reactor equipped with an internal cooling coil and inlet tubes for oxygen and monomer. A rapid stream of oxygen is introduced near the bottom of the reactor and a solution of 70 g of 2,6-xylenol in 100 ml of toluene is added through a metering pump, over a period of fifteen minutes, to the rapidly stirred solution. The temperature is maintained initially at about 40° C. to about 45° C./48° C. towards the end of the run by circulating water from a constant temperature bath through the cooling coil. Molecular weight build is continuously monitored with a typical reaction time to target I.V. of about 100–107 minutes.

In the glass reactor vessel, the copper catalyst was complexed by the addition of a complexant like nitrilotriacetic acid (NTA) or other copper complexing agent in order to solubilize it in the aqueous liquid phase. The equilibration time was approximately 70 minutes and the temperature was approximately 55° C. The catalyst was removed with centrifugation.

Although the conditions are for a laboratory scale reaction they in general scaleable to commercial processes carried out in commercial equipment without undue burden by one of skill in the art.

Preconcentration

Typical conditions for a commercial scale are as follows. The PPE containing solution is preheated to a temperature of at least 240° C. at a pressure of ca. 40 bar. The solution is flashed to low pressure in a flash vessel a PPE solids content of at least about 65%. The high solids level is desirable to reduce the solvent load to the total isolation equipment that would have been present without preconcentration. Typical conditions are tabulated below:

| P before the flash vessel: | 40 bar |
|---|---|
| T before the flash vessel: | 245–260° C. |
| Feedrate to the flash tank: | 0.7–.87 ton/hr |
| T after the flash vessel | 114–126° C. |

Total Isolation

The isolation is preferably carried out in a devolatilizing extruder. The preferred devolatilizing extruder is a co-rotating twin screw extruder with a backfeed capability. Multiple devolatilizing venting sections are preferred to achieve low volatiles content.

PPE Functionalization in an Extruder

For comparison purposes, the extruder described below was used for the functionalizing PPE powder (IV=0.32 dl/g). Extruder type, characteristics and settings:

Mini-extruder Prism 16TSE.

| Screw type | Twin self-cleaning | Temperature nose: | 290 |
|---|---|---|---|
| Screw length | 25D | Zone 1: | 284 |
| Diameter | 16 mm | Zone 2: | 302 |
| Speed | 300 rpm | Zone 3: | 240 |
| Vacuum | not used | Feeder: | 130 |

Torque = 60% (14 Nm).

Each of the functionalizing agents below was mixed with PPE at a loading of 2 weight percent based on the weight of the PPE.

a) Fumaric Acid (FA), powder (M=116, mp=300° C.).

b) Maleic Anhydride (MA), milled pellets (M=98, mp=55° C., bp=200° C.).

c) Glycidyl methacrylate (GMA), liquid (M=142, bp=189° C.).

The extruded samples were dried for 8 hours at 90° C./50 mmHg.

Purification 10 g of PPE-grafted sample was dissolved in 75 ml of toluene and then precipitated in 1 l of methanol for FA and MA, filtrated and washed with portions of methanol.

For GMA acetone was used instead of methanol. Samples were dried for 8 hours at 90° C./50 mmHg Results Grafting:

|  | PPE | PPE-g-FA | PPE-g-MA | PPE-g-GMA |
|---|---|---|---|---|
| Type | 'extruded' | [Acid] | [Anhydride] | [Epoxy] |
| IV (dl/g) | 0.39 | 0.38 | 0.37 | 0.39 |
| grafting (μeq/g) | — | 63 | 80 | 22 |
| Conversion (%) | — | 18.6 | 39.2 | 15.6 |

Calculations Grafting:
 a. PPE-g-FA measured by acid titration with sodiumethoxide.
  Start: 2 wt % FA≡172 μmol FA/g≡345 μeq acid/g
  After extrusion: 146 μeq acid/g≡73 μmol FA/g≡0.85 wt %
  After precipitation: 63 μeq acid/g≡32 μmol FA/g≡0.37 wt %
  Conversion: 32/172×100%=18.6% grafting
 b. PPE-g-MA measured by acid titration with sodiumethoxide.
  Start: 2 wt % MA≡204 μmol FA/g≡204 μeq acid/g
  After extrusion: 144 μeq acid/g≡144 μmol MA/g≡1.41 wt %
  After precipitation: 80 μeq acid/g≡80 μmol MA/g≡0.78 wt %
  Conversion: 80/204×100%=39.2% grafting
 c. PPE-g-GMA measured by FTIR on epoxy-group
  Start: 2 wt % GMA≡141 μmol GMA/g≡141 μeq epoxy/g
  After extrusion: 0.97 wt % epoxy/g≡69 μmol GMA/g≡69 μeq epoxy/g
  After extraction: 0.31 wt % epoxy/g≡22 μmol GMA/g≡22 μeq epoxy/g
  Conversion: 22/141×100%=15.6% grafting.

PPE Functionalization in Solution

To illustrate the utility of functionalization of PPE in reaction solution, a 20 weight percent PPE solution in toluene containing 5.5 weight percent of functionalizing agent was purged with nitrogen and heated at about 240° C. with agitation for about 30 minutes. The reaction solvent was removed by devolatilization. The procedure for functionality measurement including extraction and product isolation was followed as in the extruder grafting part.

Grafting efficiency for maleic anhydride was 67.2% and fumaric acid 87.1%. As can be seen by these illustrative data, higher grafting efficiency levels were unexpectedly obtained with the process of the present invention as compared to PPE functionalization of the prior art.

These and other embodiments should be apparent from the disclosure contained herein.

What is claimed:

1. A process to produce a functionalized polyphenylene ether resin, said process comprising oxidative coupling in a reaction solution at least one monovalent phenol species using an oxygen containing gas and a complex metal catalyst to produce a polyphenylene ether resin; removing at least a portion of the complex metal catalyst; and functionalizing the polyphenylene ether resin during at least one isolation step for devolatilization of the reaction solvent.

2. The process of claim 1 wherein the functionalization of the polyphenylene ether resin is at least partly done in a flash process to concentrate the polyphenylene ether resin reaction solution.

3. The process of claim 1 wherein the functionalization of the polyphenylene ether resin is at least partly done in a devolatilizing extruder.

4. The process of claim 1 wherein the functionalization of the polyphenylene ether resin comprises allowing the polyphenylene ether resin to react with a functionalizing agent having both (i) a carbon-carbon double bond or a carbon-carbon triple bond and (ii) at least one species of the group consisting of carboxylic acids, acid anhydrides, acid esters, acid amides, imides, amines, ortho esters, hydroxyls and carboxylic acid ammonium salts.

5. The process of claim 4 wherein the functionalizing agent is at least one species of the group consisting of maleic anhydride, fumaric acid, N-phenylmaleimide, 1,4-phenylene-bis-methylene-alpha,alpha'-bismaleimide, maleic hydrazide, methylnadic anhydride, fatty oils, acrylate ortho esters, methacrylate ortho esters, unsaturated carboxylic acids, unsaturated alcohols, unsaturated amines, and trialkyl amine salts of unsaturated acids.

6. The process of claim 4 wherein the functionalizing agent is at least one species of the group consisting of maleic anhydride, itaconic anhydride, aconitic anhydride, fumaric acid, and derivatives thereof.

7. The process of claim 4, wherein the functionalizing agent comprises at least one functionalizing agent selected from the group consisting of acrylic acid, crotonic acid, methacrylic acid, oleic acid, allyl alcohol, crotyl alcohol, triethylammonium fumarate, and tri-n-butylammonium fumarate.

8. The process of claim 1 wherein the functionalization of the polyphenylene ether resin comprises allowing the polyphenylene ether resin to react with a functionalizing agent comprising aliphatic polycarboxylic acids, and acid esters represented by the formula $(R^I O)_m R(COOR^{II})_n (CONR^{III}R^{IV})_s$ wherein R is a linear or branched chain, saturated aliphatic hydrocarbon of from 2 to 20 carbon atoms; $R^I$ is selected from the group consisting of hydrogen or an alkyl, aryl, acyl, or carbonyl dioxy group of 1 to 10 carbon atoms; each $R^{II}$ is independently selected from the group consisting of hydrogen or an alkyl or aryl group of from 1 to 20 carbon atoms; each $R^{III}$ and $R^{IV}$ is independently selected from the group consisting essentially of hydrogen or an alkyl or aryl group of from 1 to 10 carbon atoms; m is equal to 1 and (n+s) is greater than or equal to 2; and n and s are each greater than or equal to zero; and wherein $(OR^I)$ is alpha or beta to a carbonyl group and at least two carbonyl groups are separated by 2 to 6 carbon atoms and wherein $R^I$, $R^{II}$, $R^{III}$ and $R^{IV}$ cannot be aryl when the respective substituent has less than 6 carbon atoms.

9. The process of claim 8 wherein the aliphatic polycarboxylic acids and acid esters are selected from at least one species of the group consisting of citric acid, malic acid, agaricic acid, and the anhydrous and hydrated acids thereof.

10. The process of claim 8, wherein the functionalizing agent comprises at least one functionalizing agent selected from the group consisting of N,N'-diethyl citric acid amide, N,N'-dipropyl citric acid amide, N-phenyl citric acid amide, N-dodecyl citric acid amide, N,N'-didodecyl citric acid amide, and N-dodecyl malic acid amide.

11. The process of claim 1 wherein the functionalization of the polyphenylene ether resin comprises allowing the polyphenylene ether resin to react with at least one functionalizing agent containing an acyl functional group and at least one species of the group consisting of carboxylic acids, acid anhydrides, acid amides, imides, amines, ortho esters, hydroxyls and carboxylic acid ammonium salts.

12. The process of claim 11 wherein the functionalizing agent is at least one of the following chloroformyl succinic anhydride, chloroethanoyl succinic anhydride, trimellitic anhydride acid chloride, 1-acetoxy-acetyl-3,4-dibenzoic acid anhydride, terephthalic acid chloride, acrylic acid chloride, methacylic acid chloride, epoxyalkyl chlorocyanurates, and chloroaryloxytriazines.

13. The process of claim 1, wherein the devolatilization is accomplished at least in part with a devolatilization extruder.

14. The process of claim 1 wherein the monovalent phenol species comprises 2,6-dimethylphenol.

15. The process of claim 1 wherein the functionalized polyphenylene ether resin has an intrinsic viscosity within the range of about 0.08 dl/g to about 0.60 dl/g as measured in chloroform at 25° C.

16. The process of claim 1 wherein the functionalized polyphenylene ether resin has an intrinsic viscosity within the range of about 0.08 dl/g to about 0.16 dl/g as measured in chloroform at 25° C.

17. The process of claim 1 wherein the devolatilization is accomplished at least in part with a devolatilization extruder and an underwater pelletizer.

18. The process of claim 1, wherein the at least one monovalent phenol species comprises 2,6-dimethylphenol and 2,3,6-trimethylphenol.

19. A process to produce a compatibilized blend of a polyphenylene ether resin and at least one other polymer resin, said process comprising mixing:
   i. a functionalized polyphenylene ether resin made by a method comprising oxidative coupling in a reaction solution at least one monovalent phenol species using an oxygen containing gas and a complex metal catalyst to produce a polyphenylene ether resin; and functionalizing the polyphenylene ether resin during at least one isolation step for the devolatilization of the reaction solvent, with
   ii. the least one other polymer resin to the functionalized polyphenylene ether resin without isolation of the functionalized polyphenylene ether resin.

20. The process of claim 19 wherein the functionalization of the polyphenylene ether resin is at least partly done in a flash process to concentrate the polyphenylene ether resin reaction solution.

21. The process of claim 19 wherein the functionalization of the polyphenylene ether resin is at least partly done in a devolatilizing extruder.

22. The process of claim 19, wherein the devolatilization is accomplished at least in part with a devolatilization extruder.

23. The process of claim 19 wherein the least one other polymer resin is at least partially added to the devolatilization extruder.

24. The process of claim 19 comprising melt feeding the functionalized PPE into a compounding extruder.

25. The process of claim 24 wherein the least one other polymer resin is at least partially added to the compounding extruder.

26. The process of claim 19 wherein the polymer resin is at least one resin selected from the group consisting of polyamides, polyesters, polyarylene sulfides, polycarbonates, polyetherimides, functionalized polyolefins, polysulfones, and polyethersulfones.

27. The process of claim 19 wherein the functionalization of the polyphenylene ether resin comprises allowing the polyphenylene ether resin to react with a functionalizing agent having both (i) a carbon-carbon double bond or a carbon-carbon triple bond and (ii) at least one species of the group consisting of carboxylic acids, acid anhydrides, acid amides, imides, amines, ortho esters, hydroxyls and carboxylic acid ammonium salts.

28. The process of claim 19 wherein the monovalent phenol species comprises 2,6-dimethylphenol.

* * * * *